United States Patent [19]

Murai

[11] Patent Number: 5,355,499
[45] Date of Patent: Oct. 11, 1994

[54] INTERRUPTION CIRCUIT OPERABLE AT A HIGH SPEED

[75] Inventor: Masao Murai, Tokyo, Japan

[73] Assignee: NEC Corporation, Tokyo, Japan

[21] Appl. No.: 868,519

[22] Filed: Apr. 15, 1992

[30] Foreign Application Priority Data

Apr. 15, 1991 [JP] Japan .................................. 3-109892

[51] Int. Cl.⁵ .............................................. G06F 13/14
[52] U.S. Cl. ..................... 395/725; 364/DIG. 1;
       364/241.2; 364/241.3; 364/241.5; 364/280.8
[58] Field of Search ........................ 395/725, 325, 275

[56] References Cited

U.S. PATENT DOCUMENTS

| 3,434,111 | 6/1966 | Schmidt et al. | 340/172.5 |
|---|---|---|---|
| 3,921,145 | 11/1975 | Emm et al. | 395/725 |
| 4,099,255 | 7/1978 | Stanley et al. | 395/725 |
| 4,159,516 | 6/1979 | Henrion et al. | 395/725 |
| 4,275,458 | 6/1981 | Khera | 364/900 |
| 4,646,260 | 2/1987 | Chasse et al. | 395/725 |
| 4,648,029 | 3/1987 | Cooper et al. | 395/725 |
| 4,734,882 | 3/1988 | Ramagosa | 395/725 |
| 4,807,117 | 2/1989 | Hoku et al. | 395/725 |
| 4,953,072 | 8/1990 | Williams | 395/725 |
| 4,994,960 | 2/1991 | Tuchler et al. | 395/725 |
| 5,101,199 | 3/1992 | Suzuki | 340/825.08 |

FOREIGN PATENT DOCUMENTS

3238826A1  5/1983  Fed. Rep. of Germany .

OTHER PUBLICATIONS

Clements, Microprocessors and Microsystems, vol. 10, No. 5, Jun. 1986, pp. 258-267.

Primary Examiner—Debra A. Chun
Attorney, Agent, or Firm—Foley & Lardner

[57] ABSTRACT

In an interruption circuit, each of a multiplicity of interruption generating units (12) is for generating an interruption signal upon occurrence of an interruption request. A scanning arrangement scans the units to specify one of them at a time as a particular unit and to supply the signal generated by the particular unit to a CPU (11) as a particular signal. A response supply arrangement supplies the particular unit with a response produced by the CPU upon receipt of the particular signal. Supplied with the response, the particular unit supplies the CPU with an interruption vector which is specific to each unit and makes the CPU interrupt its operation related to the particular unit. Preferably the scanning arrangement comprises a scanning circuit (16) and a first plurality of polling circuits (17), each for a second plurality of generating units with a response control circuit (27) made to correspond thereto.

9 Claims, 7 Drawing Sheets

INTERRUPTION CIRCUIT OPERABLE AT A HIGH SPEED

BACKGROUND OF THE INVENTION

This invention relates to an interruption circuit for use in combination with a central processing unit in interrupting operation of the central processing unit when the central processing unit receives an interruption signal from one of a multiplicity of interruption generating units or interruption sources and when the central processing unit identifies that one of the interruption generating units.

For use in combination with such an interruption circuit, each interruption generating unit is for generating an interruption signal upon occurrence of an interruption requesting phenomenon which is herein called an interruption request. The interruption circuit comprises a scanning arrangement between the central processing unit and the multiplicity of interruption generating units for scanning the interruption generating units to specify one of the interruption generating units at a time as a particular unit. The scanning arrangement supplies the interruption signal generated by the particular unit to the central processing unit as a particular signal.

In a conventional interruption circuit which will later be described more in detail, the scanning arrangement supplies the central processing unit additionally with an identification signal which identifies the particular unit. Supplied with the particular signal and the identification signal, the central processing unit interrupts its operation related to the particular unit. It takes an appreciably long time for the central processing unit to receive the identification signal and as a consequence to actually interrupt the operation after the interruption signal is generated by the particular unit.

SUMMARY OF THE INVENTION

It is therefore an object of the present invention to provide an interruption circuit operable at a high speed.

Other objects of this invention will become clear as the description proceeds.

On setting forth the gist of this invention, it is possible to understand that an interruption circuit is for use in combination with a central processing unit and a multiplicity of interruption generating units, each of which is for generating an interruption signal upon occurrence of an interruption request.

According to this invention, the above-understood interruption circuit comprises: (A) a scanning arrangement between the central processing unit and the interruption generating units for scanning the interruption generating units to specify one of the interruption generating units at a time as a particular unit and for supplying the central processing unit with the interruption signal generated by the particular unit to make the central processing unit produce a response signal: (B) a response supply arrangement between the central processing unit and the interruption generating units for supplying the response signal to the particular unit: and (C) a vector supply arrangement between the central processing unit and the interruption generating units for making the particular unit supply, upon reception of the response signal, the central processing unit with an interruption vector which is specific to each of the interruption generating units and makes the central processing unit interrupt its operation related to the particular unit.

BRIEF DESCRIPTION OF THE DRAWING

FIG. 6 is a block diagram of each of the interruption generating units mentioned in connection with FIG. 3.

DESCRIPTION OF THE PREFERRED EMBODIMENT

Figure 1:
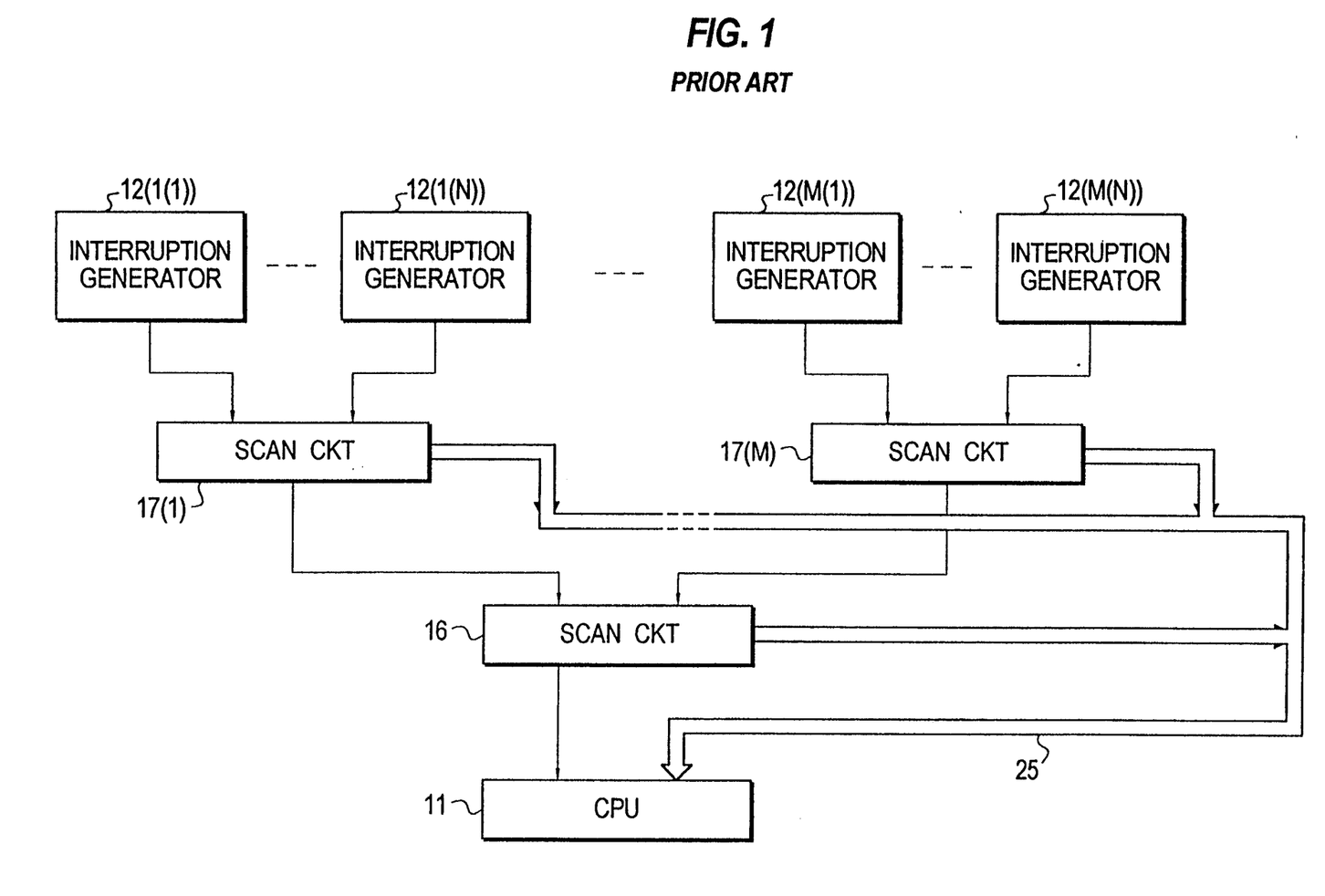
FIG. 1 shows in blocks a conventional interruption circuit together with a central processing unit and a multiplicity of interruption generating units.

Referring to FIG. 1, a conventional interruption circuit will first be described in order to facilitate an understanding of the present invention. Such an interruption circuit is for use in combination with a central processing unit (CPU) 11 and a multiplicity of interruption generating units or interruption sources which will be designated either singly or collectively by a reference numeral 12 for the time being.

The interruption generating units 12 are grouped into first through M-th groups, each group comprising first through N-th interruption generating units, where M represent a first plurality, N representing a second plurality. Although called "plurality", each of the first and the second pluralities may be equal to one. The interruption generating units 12 may be different in number in the first through the M-th groups of interruption generating units 12. It will, however, be presumed merely for simplicity of the description that each group comprises a preselected number N of interruption generating units 12.

In an m-th group, an n-th interruption generating unit will be called an m(n)-th interruption generating unit and will be designated by 12(m(n)), where m represents one of i through M at a time as a first selected number, n representing one of 1 through N at a time as a second selected number. The m-th group therefore comprises m(1)-th through m(N)-th interruption generating units 12(re(1))to 12(re(N)).

Each interruption generating unit 12 is for generating an interruption signal as an originating interruption signal S(1) upon occurrence of an interruption requesting phenomenon which is herein called an interruption request. The multiplicity of interruption generating units 12 may consequently generate a plurality of interruption signals substantially simultaneously. The interruption circuit is for supplying such interruption signals to the central processing unit 11 with congestion of these interruption signals avoided at the central processing unit 11.

Supplied with an interruption signal from one of the interruption generating units 12 as a particular signal, the central processing unit 11 interrupts its operation related to the interruption generating unit from which the interruption signal is received as the particular signal. It follows as a consequence that the interruption circuit must supply the central processing unit 11 with an identification signal in order to enable the central processing unit 11 to identify one of the interruption generating units 12 as a particular unit from which the interruption signal is received as the particular signal.

In FIG. 1, the interruption circuit comprises a combination of a single scanning circuit 16 and first through M-th scanning circuits 17(1) to 17(M) between the central processing unit 11 and the multiplicity of interruption generating units 12. Connected to the single scanning circuit 16 in common, the first through the M-th scanning circuits 17 (suffixes omitted) are connected, on actually putting the interruption circuit in operation, to the interruption generating units 12 of the first through the M-th groups, respectively. In such a manner, an m-th scanning circuit 17(m) is connected to the m(1)-th through the m(N)-th interruption generating units 12(m(1)) to 12(m(N)).

Figure 2:
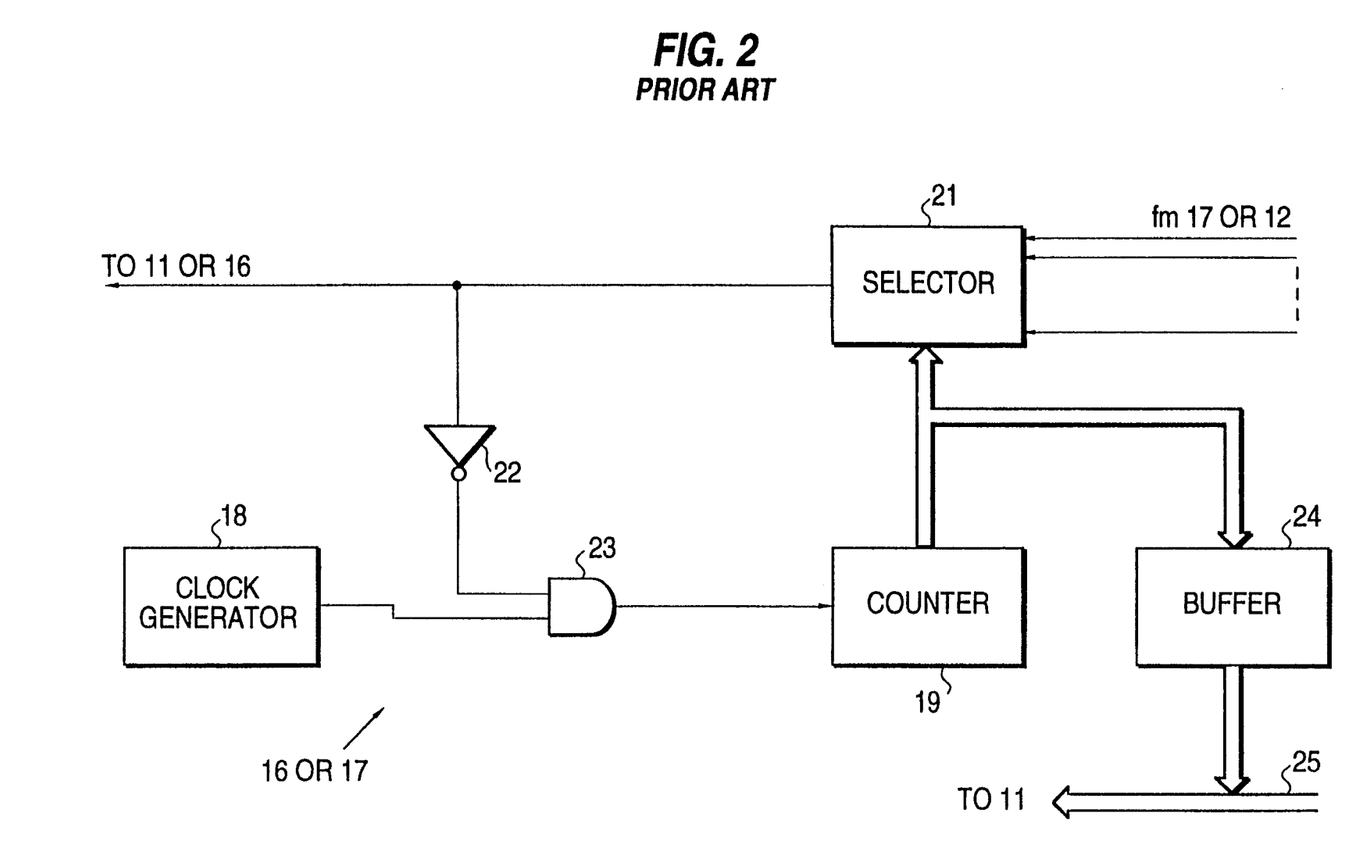
FIG. 2 is a block diagram of a scanning circuit for use in the interruption circuit illustrated in FIG. 1.

Turning to FIG. 2 with reference to FIG. 1 continued, each scanning circuit 16 or 17 is for use as one of the single and the first through the M-th scanning circuits 16 and 17 and comprises a clock generator 18 for generating a sequence of clock pulses. In the manner which will presently be described, the clock pulses are delivered to a counter 19 for counting the clock pulses supplied thereto.

The counter 19 has a full count equal to a predetermined number which is not less than the first plurality M in the single scanning circuit 16 and than the second plurality N in each of the first through the M-th polling circuits 17. For convenience of the description which follows, the predetermined number will be called a first predetermined number for the single scanning circuit 16 and a second predetermined number for each of the first through the M-th scanning circuits 17. Furthermore, the first predetermined number will be represented by M and the second predetermined number, by N.

Under the circumstances, the counter 19 repeatedly cyclically counts up a first count from 1 up to the first predetermined number M in the single scanning circuit 16 and a second count from 1 up to the second predetermined number N in each of the first through the M-th scanning circuits 17. The first count of 1 through M corresponds to the first through the M-th scanning circuits 17. The second count of i through N corresponds to the m(1)-th through the m(N)-th interruption generating units 12(m(1)) to 12(m(N)) in the m-th scanning circuit the scanning circuit 10 or 17 illustrated in FIG. 2, a count signal representative of the first or the second count is supplied to an interruption signal selector 21. In the m-th scanning circuit 17(m), the selector 21 is for receiving the originating interruption signal or signals S(1) from the m(1)-th through the m(N)-th interruption generating units 12(m(1)) to 12(m(N)). In the manner which will shortly become clear, the selector 21 selects one of such originating interruption signals at a time as a once relayed interruption signal S(2) for delivery to the single scanning circuit 16. In the single scanning circuit 16, the selector 21 is connected to the selectors 21 of the first through the M-th scanning circuits 17 to select one of the once relayed interruption signals at a time as a twice relayed interruption signal S(3) for delivery to the central processing unit 11 as the particular signal.

Referring more particularly to FIG. 2, it will be surmised that each of the originating, the once relayed, and the twice relayed interruption signals has a logic one level. From the interruption signal selector 21, the interruption signal S(2) or S(3) is supplied through an inverter 22 to a first input terminal of a two-input AND gate 23 which has a second input terminal connected to the clock generator 18 and an output terminal connected to the counter 19. Inverted by the inverter 22 to a logic sero level, the logic one level of the interruption signal inhibits supply of the clock pulses from the clock generator 18 to the counter 19 through the AND gate 23.

Assuming that the interruption signal selector 21 of the single scanning circuit 16 has selected the once relayed interruption signal supplied from the m-th scanning circuit 17(m), count up of the first count is suspended at a first selected count m. When the selector 21 selects the originating interruption signal received from the m(n)-th interruption generating unit 12(m(n)), count up of the second count is suspended at a second selected count n in the m-th scanning circuit 17(m). The count signal representative of the first selected count m or the second selected count n is stored in a selected count buffer 24.

Receiving the twice relayed interruption signal as the particular signal, the central processing unit 11 begins to deal with the particular signal. The selected count buffers 24 of the single and the m-th scanning circuits 16 and 17(m) are controlled to deliver the count signals representative of the first and the second selected counts m and n to the central processing unit 11 through a data bus 25 collectively as the identification signal which identifies the m(n)-th interruption generating unit 12(m(n)) as the particular unit in the manner described above. Supplied additionally with the identification signal, the central processing unit 11 interrupts its operation related to the particular unit.

Reviewing FIGS. 1 and 2, it is now understood that basic requirements are satisfied by the interruption circuit. That is to say, only one of the originating inturruption signals is supplied to the central processing unit 11 at a time as the particular signal with congestion of such interruption signals avoided at the central processing unit 11. Furthermore, the particular unit is identified to enable the central processing unit 11 to duly carry out its interruption operation. It should, however, be noted that an appreciably long interval of time is necessary in identifying the particular unit and consequently in completely dealing with the particular signal.

Figure 3:
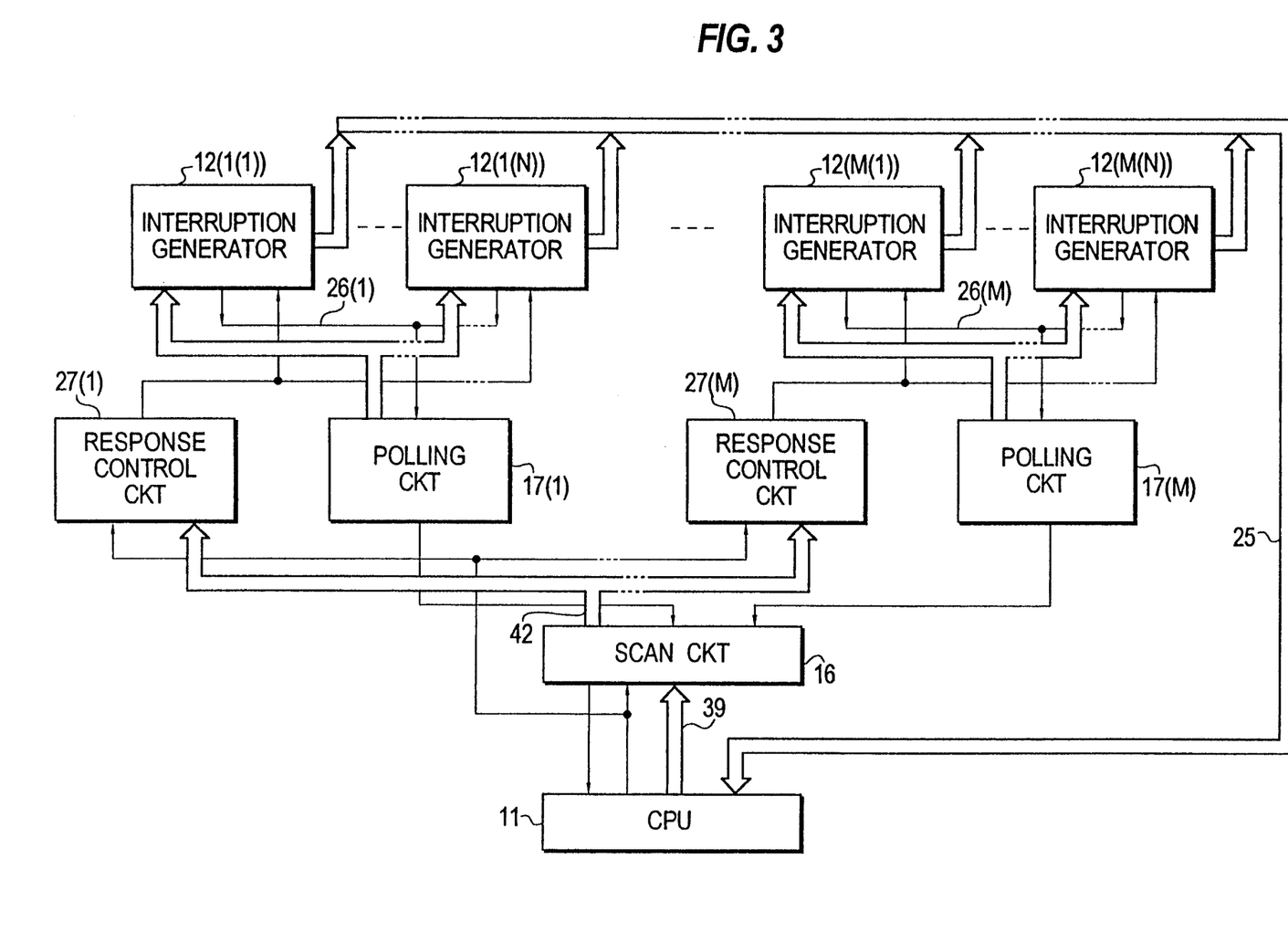
FIG. 3 shows in blocks an interruption circuit according to an embodiment of the instant invention in combination with a central processing unit and a multiplicity of interruption generating units.

Referring now to FIG. 3, attention will be directed to an interruption circuit according to a preferred embodiment of this invention. Similar parts are designated by like reference numerals and are, unless otherwise positively mentioned, similarly operable with likewise named signals which are indicated by like reference symbols.

A shelf number will now be used to identify each of 1 through the first predetermined number M. A generating unit number will be used to identify each of 1 through the second predetermined number N. The shelf number may be variable between zero (0) and the first predetermined number less one (M−1), both inclusive. The shelf number representative of (m−1) indicates in this event the m-th polling circuit 17(m) and the m-th group of interruption generating units 12(m(1)) through 12(m(N)). The unit number may similarly vary between zero and the second predetermined number less one (N−1), both inclusive. When the shelf number represents (m−1), the unit number representative of (n−1) identifies the m(n)-th interruption generating unit In a typical set of numerical examples, the first predetermined number M is equal to eight. The second predetermined number N is equal to thirty-two. Under the circumstances, the multiplicity can theoretically be equal to two hundred and fifty-six. The multiplicity is, however, equal in practice to one hundred and ninety-two. In this event, use is not made of the shelf number representative of zero and one. It is nevertheless possible in such a case to renumber the Coups of interruption generating units afresh from 1 to the first plurality M.

For the reason which will presently become clear, the first through the M-th scanning circuits will now be referred to as first through M-th polling circuits 17(1) to 17(M) with the m-th scanning circuit called an m-th polling circuit 17(m). The single scanning circuit will therefore be referred to simply as a scanning circuit 16.

A combination of the scanning circuit 16 and the first through the M-th polling circuits 17 is herein called a scanning arrangement. Interposed between the central processing unit 11 and the multiplicity of interruption generating units 12. The scanning arrangement (16, 17) scans the interruption generating units 12 to specify one of the interruption generating units 12 at a time as the particular unit mentioned before and supplies, as the twice relayed interruption signal S(3), the originating interruption signal S(1) generated by the particular unit.

it will be understood in the interruption circuit being illustrated that the first through the M-th polling circuits 17 are connected in practice to the interruption generating units 12 of the first through the M-th groups by first through M-th wired OR circuits 26(1) to 26(M). An m-th wired OR circuit 26(m) is used between the m-th polling circuit 17(m) and the interruption generating units 12(m(1)) through 12(m(N)) of the m-th group. A combination of the first through the M-th wired OR circuits 26 (suffixes omitted) is herein referred to as a connection arrangement.

Through the m-th wired OR circuit 26(m), an m-th interruption signal is delivered to the m-th polling circuit 17(m). As called herein. The m-th interruption signal is at least one of the originating interruption signals which are generated by the m(1)-th through the m(N)-th interruption generating units 12(m(1)) to 12(m(N)) to coexist at a certain time instant and may accordingly be an m(n)-th interruption signal generated by the m(n)-th interruption generating unit 12(m(n)).

In the manner which will shortly be described, the m-th polling circuit 17(m) selects as the once relayed interruption signal S(2) one of the originating interruption signals which are received either singly or collectively as the m-th interruption signal. Receiving the twice relayed interruption signal as the particular signal, the central processing unit 11 produces an interruption acknowledgement signal as an originating response signal R(1) with a logic one level.

The central processing unit 11 may be a one-chip unit which comprises an interruption signal receiving hardware circuit (not shown). Receiving the particular signal, the interruption signal receiving hardware circuit begins to deal with the particular signal while producing the originating response signal.

Between the central processing unit 11 and the interruption generating units 12, the interruption circuit comprises a plurality of interruption response control circuits in correspondence to the first through the M-th polling circuits 17. Identified by the shelf number, the interruption response control circuits are referred to as first through M-th control circuits 27(1) to 27(M). An m-th control circuit 27(m) corresponds to the m-th polling circuit 17(m). When desired, it is possible to refer to a combination of the m-th polling circuit 17(m), the m-th control circuit 27(m), and the m-th group of interruption generating units 12(m(1)) through 12(m(N)) as an m-th shelf.

A combination of the interruption response control circuits or the first through the M-th control circuits 27 (suffixes omitted) serves as a response supply arrangement. Interposed between the central processing unit 11 and the multiplicity of interruption generating units 12 and in the manner which will later be described, the response supply arrangement (27) supplies the originating response signal R(1) to the particular unit as a relayed response signal R(2) with the logic one level.

In the manner which will further later be described, the m(n)-th interruption generating unit 12(m(n)) delivers an m(n)-th interruption vector to the data bus 25 when supplied with the relayed response signal. Such an interruption vector is therefore specific to each of the multiplicity of interruption generating units 12. For the set of numerical examples described above, the interruption vector has eight bits, three bits representing the shelf number and five additional bits representing the generation unit number. When produced by the particular unit, such an interruption vector V(1) is supplied through the data bus 25 to the central processing unit 11 as the identification signal described before.

The data bus 25 serves as a vector supply arrangement. Interposed between the central processing unit 11 and the interruption generating units 12, the vector supply arrangement (25) supplies the central processing unit 11 with the interruption vector V(1) produced by the particular unit. Supplied with the interruption vector in addition to the particular signal. The central processing unit 11 interrupts its operation related to the particular unit. When such an interruption vector comes to an end, the central processing unit 11 gives an end to the originating response signal. In this event, it is possible to understand that a logic zero signal is produced by the central processing unit 11 instead of the originating response signal.

Figure 4:
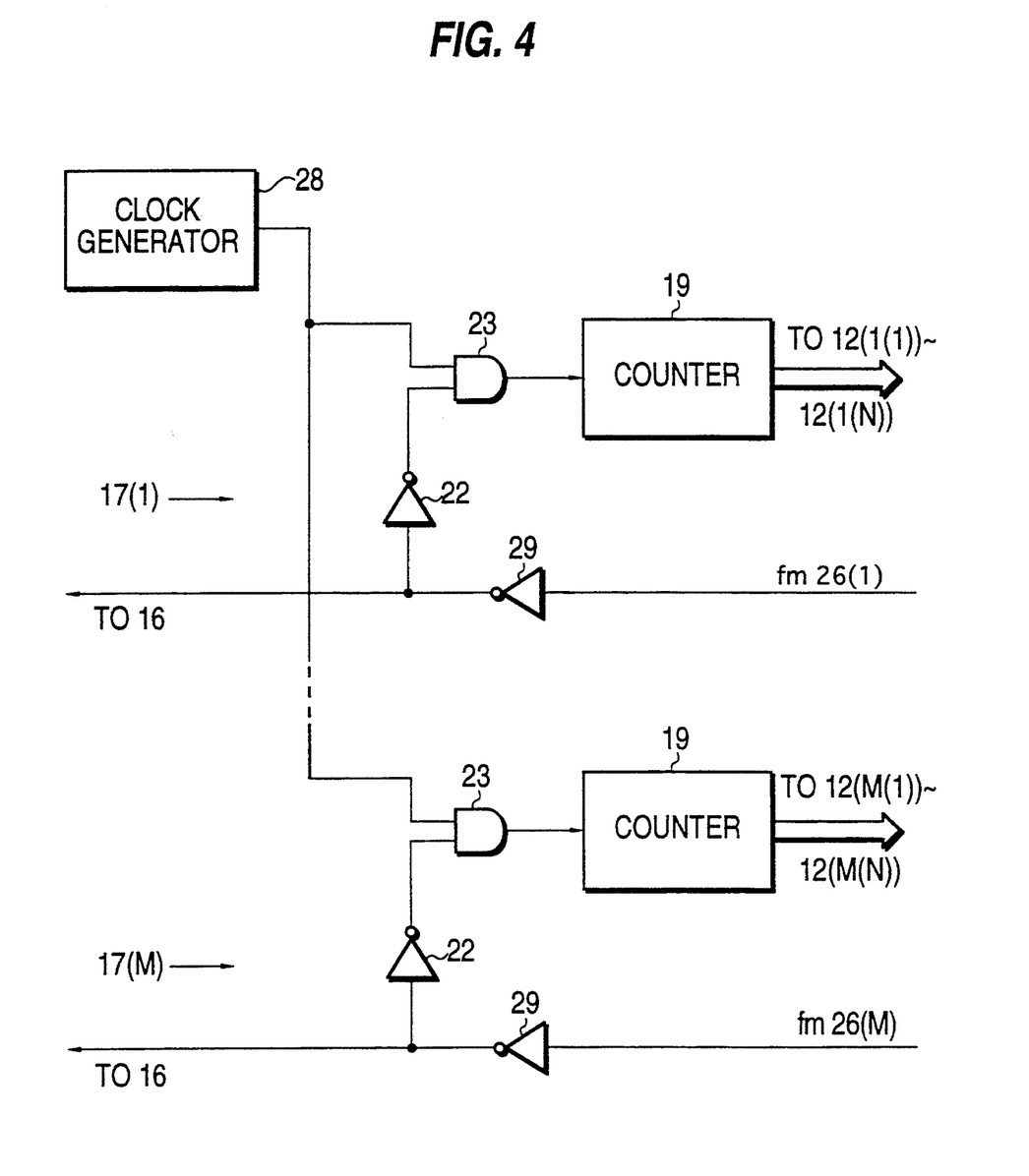
FIG. 4 is a block diagram of a plurality of polling circuits for use in the interruption circuit shown in FIG. 3.

Turning now to FIG. 4, the first through the M-th polling circuits 17 comprise a common clock generator 28 for generating a sequence of common clock pulses. The common clock pulse sequence preferably has a polling clock frequency of 1 MHz. When the polling clock frequency is rendered higher, it becomes difficult to implement the polling circuits 17.

The m-th polling circuit 17(m) comprises an m-th counter which is equivalent to the counter 19 described in conjunction with FIG. 2 and will consequently be designated by the reference numeral 19. The m-th counter 19 has a full polling count which is equal to the second predetermined number N. Supplied with the common clock pulses in the manner which will be described hereinunder. The m-th counter 19 counts the common clock pulses as an m-th count from an initial count of zero up to the full polling count. When the full polling count is reached, the m-th count is reset to the initial count. As a consequence, the m-th counter 19 repeatedly or cyclically counts up the m-th count from zero to the second predetermined number less one (N−1) if continuously supplied with the common clock pulses.

The m-th counter 19 produces an m-th unit selection signal U(1) representative of the m-th count. By supplying the m-th unit selection signal to the interruption generating units 12(m(1)) through 12(m(N)) of the m-th group, the m-th polling circuit 17(m) cyclically scans the m(1)-th through the m(N)-th interruption generating units 12(m(1)) to 12(m(N)) to specify one of the m(1)-th through the m(N)-th interruption generating units 12(m(1)) to 12(m(N)) at a time as an identified unit. It is consequently possible depending on the circumstances to understand that the m-th count repeatedly varies between 1 and the second predetermined number N, both inclusive.

It will be surmised that the originating interruption signal S(1) has a logic zero level. An m-th primary inverter 29 is for giving a logic one level to the m-th interruption signal supplied thereto through the m-th wired OR circuit 26(m). An m-th secondary inverter and an m-th two-input AND gate are equivalents of the inverter 22 and the two-input AND gate 23 described in conjunction with FIG. 2 and are consequently indicated by the reference numerals 22 and 23.

The m-th primary inverter 29 serves as an m-th delivery arrangement. Interposed between the scanning circuit 16 and the m(1)-th through the m(N)-th interruption generating units 12(m(1)) to 12(m(N)) and connected to the scanning circuit 16 and to the m-th wired OR circuit 26(m), the m-th delivery arrangement (29) supplies the scanning circuit 16 with the m-th interruption signal as the once relayed interruption signal S(2) having the logic one level.

A combination of the m-th secondary inverter 22 and the m-th two-input AND gate 23 serves as an m-th controller. Connected to the common clock generator 28 together with other controllers, to the m-th counter 19, and to the m-th delivery arrangement. The m-th controller (22,23) supplies the common clock pulses to the m-th counter 19. It is now understood that the m-th counter 19 counts up the m-th count while none of the m(1)-th through the m(N)-th interruption generating units 12(m(1)) to 12(m(N)) generates the originating interruption signal.

When the m-th interruption signal is generated, the m-th controller suspends supply of the common clock pulses to the m-th counter 19 and suspends count up of the m-th count. If the m-th interruption signal is the m(n)-th interruption signal, the count up is suspended when the m-th count is counted to the second selected count n mentioned before.

An overall combination of the m-th delivery arrangement and the m-th controller serves as an m-th controlling arrangement. Connected to the m-th counter 19 and the m-th wired OR circuit 26(m) between the scanning circuit 16 and the m(1)-th through the m(N)-th interruption generating units 12(m(1)) to 12(m(N)), the m-th controlling arrangement (22, 23, 19) makes the m-th counter 19 count up the m-th count repeatedly from the initial count to the full polling count while no originating interruption signal is generated by the m(1)-th through the m(N)-th interruption generating units 12(m(1)) to 12(m(N)).

Including the m-th controller, the m-th controlling arrangement suspends count up of the m-th count at the second selected count when the m(n)-th interruption signal is generated. Including the m-th delivery arrangement, the m-th controlling arrangement supplies the scanning circuit 16 with the m-th interruption signal while count up of the m-th count is suspended.

Reviewing FIG. 4, it should be noted that the first through the M-th polling circuits 17 may be installed at separate locations. In such an event, use of the common clock generator 28 is objectionable. It is preferred that the m-th polling circuit 17(m) should comprise an m-th clock generator for generating an m-th sequence of clock pulses, which may be called m-ary clock pulses. In the first through the M-th polling circuits 17, such clock generators can asynchronously generate independent sequences of clock pulses. It is possible to understand that the m-th clock generator is depicted at 18 like in FIG. 2.

Figure 5:
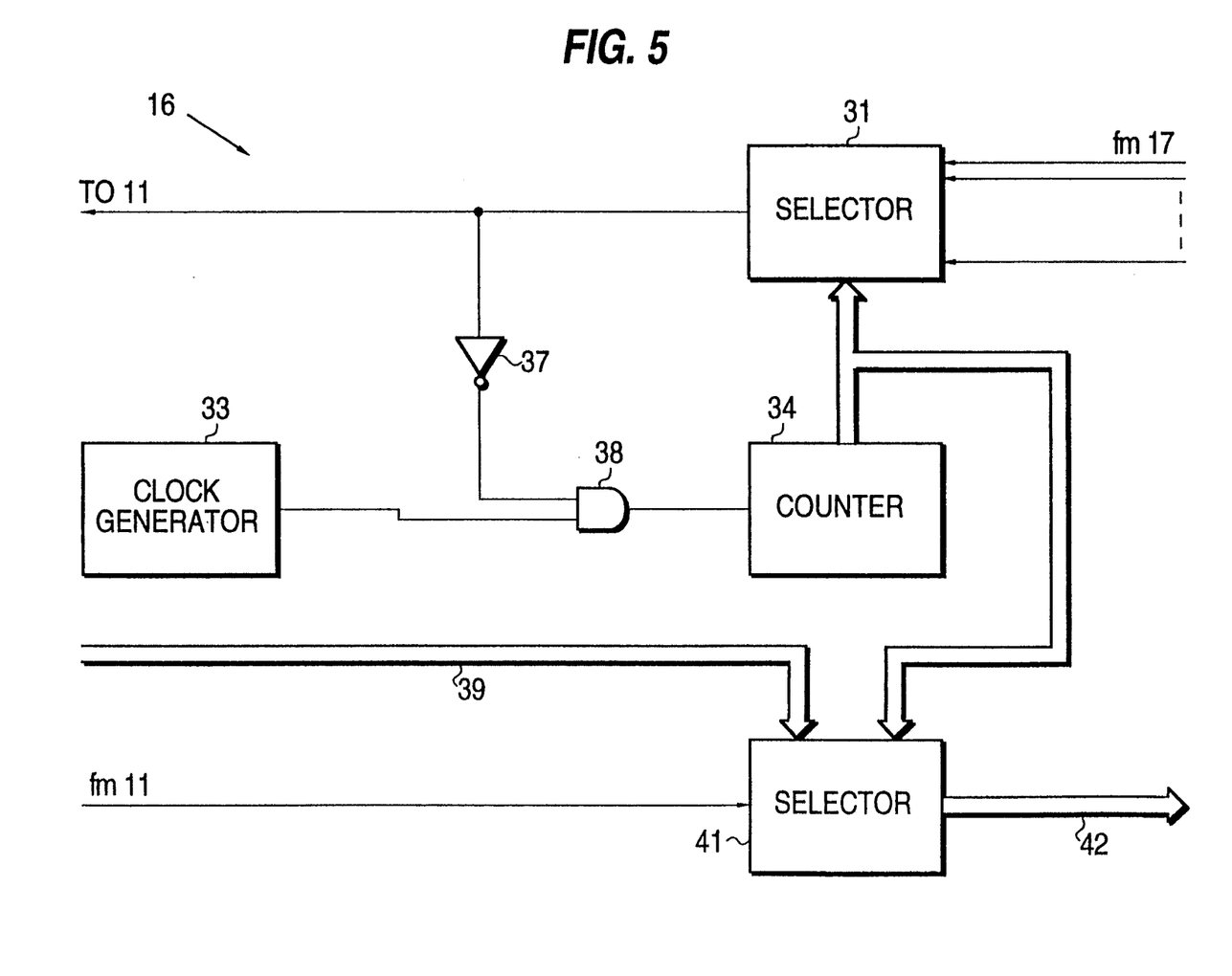
FIG. 5 is a block diagram of a scanning circuit for use in the interruption circuit depicted in FIG. 3.

Further turning to FIG. 5 with FIG. 3 additionally referred to, the scanning circuit 16 comprises an interruption signal selector 31 supplied, like the interruption signal selector described in conjunction with FIG. 2, with the once relayed interruption signal or signals S(2) of the logic one level from at least one of the first through the M-th delivery arrangements of the first through the M-th polling circuits 17. The selector 31 is controlled in the manner described with reference to FIG. 2 and will presently be described.

A scan clock generator 33 is for generating a sequence of scan clock pulses at a scan clock frequency which is typically 1 MHz like the polling clock frequency. The scan clock pulse sequence need not be synchronized with the sequence of either the common clock pulses or of the m-ary clock pulses. Furthermore, the scan clock frequency need not be equal to the polling clock frequency.

A scan counter 34 has a full scan count which is equal to the first predetermined number M. Supplied with the scan clock pulse sequence in the manner which will be described below, the scan counter 34 counts the scan clock pulses as a scan count from an initial count of zero up to the full scan count. When the full scan count is reached, the scan count is reset to the initial count. Consequently, the scan counter 34 repeatedly or cyclically counts up the scan count from zero to the first predetermined number less one (M−1).

The scan counter 34 produces a scan count signal representative of the scan count. Controlled by the scan count signal, the interruption signal selector 31 selects one of the once relayed interruption signals S(2) at a time as the twice relayed interruption signal S(3) having the logic one level to supply the twice relayed interruption signal to the central processing unit 11.

Using the scan count signal in this manner, the scanning circuit 16 cyclically scans the first through the M-th polling circuits 17 to specify one of the polling circuits 17 at a time as a particular circuit. As a result, it is possible to understand depending on the circumstances that the scan count repeatedly varies between i and the first predetermined number M, both inclusive. The identified unit is the particular unit when specified by the particular circuit.

The twice relayed interruption signal S(3) is supplied through an inverter 37 to a first input terminal of a two-input AND gate 38 which has a second input terminal connected to the scan clock generator 33 and an output terminal connected to the scan counter 34. Inverted by the inverter 37 to the logic zero level, the logic one level of the twice relayed interruption signal inhibits supply of the scan clock pulses from the scan clock generator 33 to the scan counter 34.

Assuming that the twice relayed interruption signal is derived from the once relayed interruption signal supplied from an m′-th polling circuit 17(m′), where m′ represents an arbitrary one of 1 through the first predetermined number M at a time as a first selected count or number, supply of the scan clock pulses to the scan counter 34 is suspended when the scan count is counted to the first selected count m'. Incidentally, the m-th counter 19 (FIG. 4) will be said to suspend count up of the m-th count at a second selected count or number n.

In the manner described in the foregoing, the central processing unit 11 produces the interruption acknowledgement signal as the originating response signal R(1). It may be mentioned here that the central processing unit 11 supplies an address bus 39 with a shelf number signal A(1) which will become clear as the description proceeds. The m-th count and the scan count are suspended as described so as not to undesiredly bring about an end to the twice relayed interruption signal S(3) which may continue from one microsecond to several hundreds of microseconds depending on an instruction under execution by the central processing unit 11.

The scanning circuit 16 comprises an address selector 41 which is supplied with the scan count signal from the scan counter 34 and with the shelf number signal through the address bus 39 and is controlled by the originating response signal. Unless the originating response signal is produced, the address selector 41 delivers the shelf number signal to an address branch 42. When the scan count is suspended at the first selected count m'. The originating response signal is produced. In this event, the address selector 41 supplies the scan count signal to the address branch 42 as an address signal A(2). The shelf number signal is made to indicate under the circumstances the first selected count to serve as the address signal.

It will be seen in FIG. 3 that the address branch 42 is connected to the interruption response control circuits or the first through the M-th control circuits 27. The scanning circuit 16 therefore produces the address signal to specify one of the first through the M-th control circuits 27 that corresponds to the particular circuit of the first through the M-th polling circuits 17 as a particular control circuit.

Referring more particularly to FIG. 5, the interruption signal selector 31 serves as a scan delivery arrangement. Connected to the scan counter 34 between the central processing unit 11 and the first through the M-th polling circuits 17, the scan delivery arrangement (31) supplies the central processing unit 11 as the twice relayed interruption signal with an m''-th interruption signal which is delivered from an m''-th polling circuit 17(m''), where m'' represents an arbitary one of 1 through the first predetermined number at a time.

A combination of the inverter 37 and the two-input AND gate 38 serves as a scan controller. Connected to the scan counter 34, the scan clock generator 33, and the scan delivery arrangement, the scan controller (37, 38) supplies the scan counter 34 with the scan clock pulses. The scan counter 34 counts up the scan count while no interruption signal is delivered from the first through the M-th polling circuits 17.

When supplied with the m'-th interruption signal from the m'-th polling circuit 17(m'), the scan controller suspends supply of the scan clock pulses from the scan clock generator 33 to the scan counter 34 and suspends count up of the scan count at the first selected count m'. If the m'-th interruption signal is delivered from the particular circuit, the scan counter 34 is suspended when the scan count signal indicates the particular unit. In this manner. The particular unit is specified by the polling circuits 17.

An overall combination of the scan delivery arrangement and the scan controller serves as a scan controlling arrangement. Connected to the scan counter 34 between the central processing unit 11 and the first through the M-th polling circuits 17, the scan controlling arrangement (31, 37, 38) makes the scan counter 34 count up the scan count repeatedly from the initial count up to the full ;scan count while no interruption signal is supplied from the first through the M-th polling circuits 17. Including the scan controller, the scan controlling arrangement suspends count up of the scan count at the first selected count m when supplied with the once relayed interruption signal from the m-th polling circuit 17(m). Including the scan delivery arrangement, the scan controlling arrangement supplies the central processing unit 11 with the interruption signal under consideration while count up of the scan count is suspended at the first selected count m.

Figure 6:
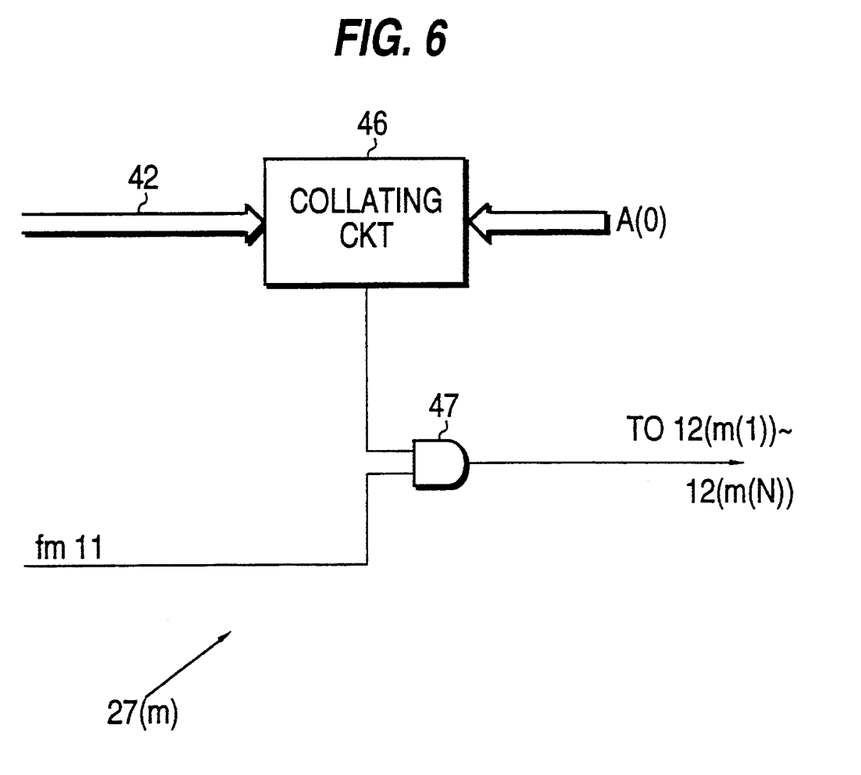
FIG. 6 is a block diagram of each of a plurality of interruption response control circuits for use in the interruption circuit illustrated in FIG. 3.

Referring to FIG. 6 with FIG. 3 continuously referred to, the m-th control circuit 27(m) is assigned with an m-th interruption response number A(O) which is equal to the shelf number given to the interruption response control circuit under consideration. The m-th control circuit 27(m) comprises an m-th address collating circuit 46 between the central processing unit 11 and the m(1)-th through the m(N)-th interruption generating units 12(m(1)) to 12(m(N)). The collating circuit 46 is supplied with the address signal A(2) from the scanning circuit 16 through the address branch 42 and with an m-th internal signal representative of the m-th interruption response number and is controlled by the originating response signal R(1) which is supplied from the central processing unit 11 and which the central processing unit 11 produces when supplied with the twice relayed interruption signal S(3) as the particular signal.

It will be presumed that the once relayed interruption signal S(2) is supplied from the m-th polling circuit 17(m) to the central processing unit 11 through the scanning circuit 16 as the twice relayed interruption signal. In this event, the address signal represents the first selected count m as the scan count. The m-th address collating circuit 46 is energized by the originating response signal to compare the interruption response number with the first selected count. When a coincidence is found, the collating circuit 46 produces an m-th coincidence signal with a logic one level.

An m-th two-input AND gate 47 has a first input terminal supplied with the originating response signal from the central processing unit 11, a second input terminal connected to the m-th address collating circuit 46, and an output terminal which is connected to the m(1)-th through the m(N)-th interruption generating units 12(m(1)) to 12(m(N)) on actually putting the interruption circuit in operation. When the m-th coincidence signal is produced, the originating response signal is delivered to the interruption generating units 12(m(1)) through 12(m(N)) of the m-th group as the relayed response signal R(2) mentioned above. Otherwise, the originating response signal is not relayed to the m(1)-th through the m(N)-th interruption generating units 12(m(1)) to 12(m(N)).

The m-th two-input AND gate 47 serves as an m-th supply arrangement. Connected to the m-th collating circuit 46 between the central processing unit 11 and the m(1)-th through the m(N)-th interruption generating units 12(m(1)) to 12(m(N)), the m-th supply arrangement (47) supplies the response signal to the m(1)-th through the m(N)-th interruption generating units 12(m(1)) to 12(m(N)) when the m-th coincidence signal is produced.

In this manner, a combination of the interruption response control circuits or the first through the M-th control circuits 27 serves as a response supply arrangement. Interposed between the central processing unit 11 and the multiplicity of interruption generating units 12, the response supply arrangement (27) supplies the particular unit with the response signal produced by the central processing unit 11 in response to the particular signal. Incidentally, it should be noted in this connection that the relayed response signal is supplied to the interruption generating units 12(m(1)) through 12(m(N)) of the m-th group in which the particular unit is included.

Figure 7:
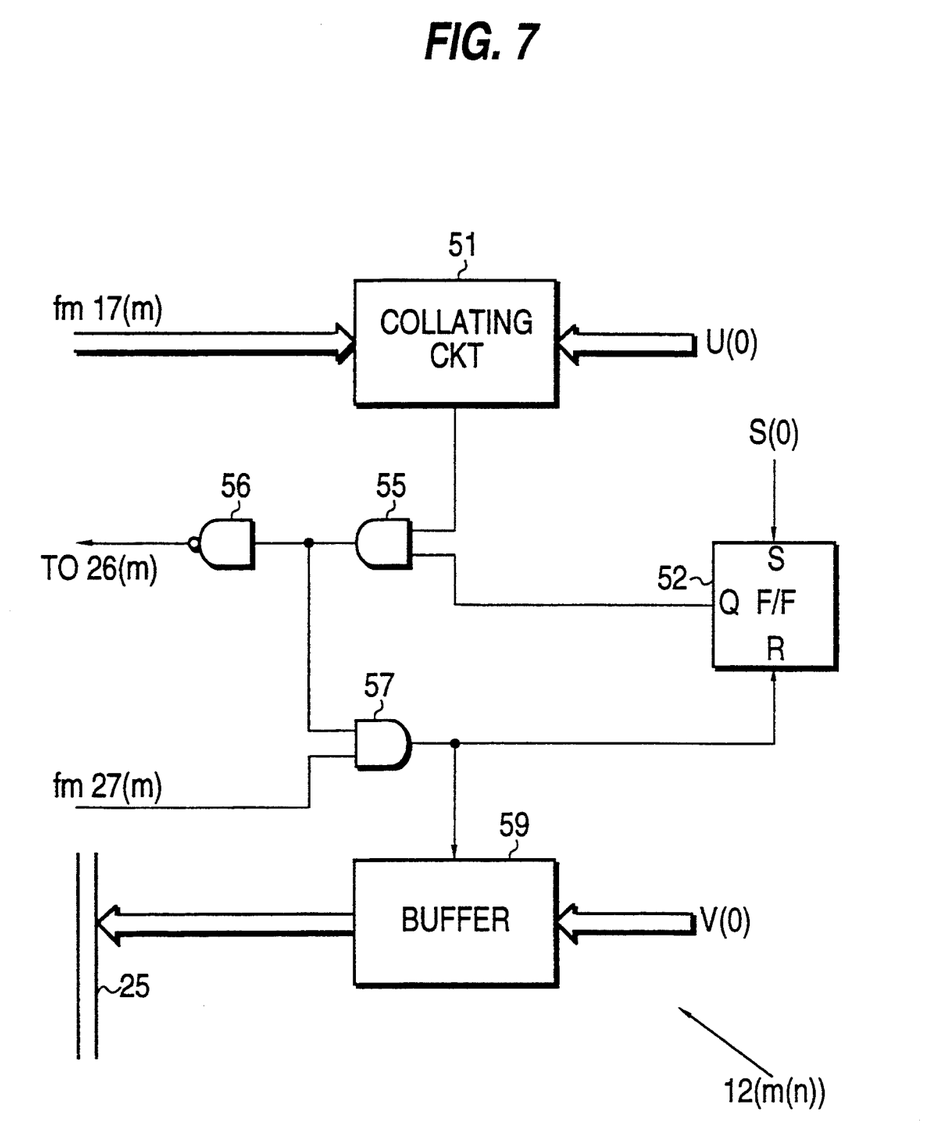

Turning now to FIG. 7 with FIG. 3 further continuously referred to, attention will be directed to the m(n)-th interruption generating unit 12(m(n)). An m(n)-th unit number U(O) is assigned to the m(n)-th interruption generating unit 12(m(n)) as the generating unit number mentioned before. The m(n)-th unit number is representative of the second selected number n alone although so called. Accordingly, the m(n)-th unit number will hereinafter be referred to as an n-th unit number.

The m(n)-th interruption generating unit 12(m(n)) comprises an m(n)-th number collating circuit 51. Supplied with the m-th unit selection signal U(1) from the m-th counter 19 (FIG. 5) of the m-th polling circuit 17(m) and with an m(n)-th internal signal representative of the n-th unit number, the collating circuit 51 compares the m-th count with the n-th unit number. When count up of the m-th count is suspended at the second selected number n, the collating circuit 51 produces an m(n)-th coincidence signal.

Having a set terminal S, a reset terminal R, and an output terminal Q, a flip-flop circuit is used as an m(n)-th one-bit memory 52. When the interruption request occurs in connection with the m(n)-th interruption generating unit 12(m(n)), an interruption signal is set or stored in the m(n)-th one-bit memory 52 as an m(n)-th memorized signal S(O).

The m(n)-th coincidence signal is delivered to a first input terminal of an m(n)-th primary AND gate 55 which has a second input terminal connected to the m(n)-th one-bit memory 52. When the m(n)-th memorized signal is present in the m(n)-th one-bit memory 52, the primary AND gate 55 supplies the m(n)-th memorized signal to an open collector gate 56. From the open collector gate 56, the m(n)-th memorized signal is delivered with the logic zero level as the m(n)-th or the originating interruption signal S(1) to the m-th polling circuit 17(m) through the m-th wired OR circuit 26(m). Through the primary AND gate 55, the m(n)-th memorized signal is delivered furthermore to a first input terminal of an m(n)-th secondary AND gate 57 which has a second input terminal supplied with the relayed response signal R(2) from the m-th control circuit 27(m).

When the m(n)-th memorized signal is present in the m(n)-th one-bit memory 52 and furthermore when the m-th control circuit 27(m) produces the relayed response signal, the secondary AND gate 57 produces an m(n)-th energizing signal for use in the manner which will shortly be described. It is now understood that the m(n)-th interruption generating unit 12(m(n)) generates the m(n)-th interruption signal with the logic zero level when the interruption request appears in connection therewith and furthermore when the m-th unit selection signal representative of the second selected number n is produced after storage of the interruption request in the m(n)-th one-bit memory 52 as the m(n)-th memorized signal.

The m(n)-th interruption generating unit 12(m(n)) comprises an m(n)-th buffer 59 in which an m(n)-th vector signal V(O) is stored. The m(n)-th energizing signal energizes the m(n)-th buffer 59 to supply the m(n)-th vector signal to the data bus 25 as the m(n)-th interruption vector V(1). In the manner described heretobefore, this interruption vector consists of three bits representative of the shelf number (m) and five additional bits representative of the n-th unit number (n). The central processing unit 11 can readily read the shelf number and the generating unit number from the interruption vector V(1) and identify one of the multiplicity of interruption generating units 12 as the particular unit.

After completion of dealing with the particular signal, the central processing unit 11 stops production of the originating response signal under consideration until another particular signal is received either from the m(n)-th interruption generating unit 12(m(n)) or another of the multiplicity of interruption generating units 12. When the response signal in question disappears, the energizing signal disappears. The m(n)-th one-bit memory 52 is reset. The memorized signal is lost from the m(n)-th one-bit memory 52 until the interruption request afresh occurs in relation to the m(n)-th interruption generating unit 12(m(n)).

Reviewing FIGS. 3 to 7, a combination of the gates 55 through 57 serves as an m(n)-th controller. Connected to the m-th controlling arrangement, the m-th supply arrangement, the m(n)-th collating circuit 51, and the m(n)-th one-bit memory 52, the m(n)-th controller (55-57) makes the m(n)-th one-bit memory 52 supply the m(n)-th interruption signal to the m-th controlling arrangement through the m(n)-th controller and the m-th wired OR circuit 26(m) when the relayed response signal R(2) is supplied to the m(1)-th through the m(N)-th interruption generating units 12(m(1)) to 12(m(N)) while the m(n)-th interruption signal is delivered to the m-th controlling arrangement, namely, when the m(n)-th coincidence signal is produced while the memorized signal is present in the m(n)-th one-bit memory 52. Furthermore, the m(n)-th controller makes the m(n)-th buffer 59 supply the m(n)-th interruption vector to the data bus 25 when the relayed response signal is supplied to the m(1)-th through the m(N)-th interruption generating units 12(m(1)) to 12(m(N)) during supply of the m(n)-th interruption signal to the m-th controlling arrangement. Still further, the m(n)-th controller resets the m(n)-th one-bit memory 52 when the central processing unit 11 gives an end to the originating response signal R(1). Incidentally, it should be understood that the m(n)-th buffer 59 is connected to the data bus 25 or the vector supply arrangement and to the m(n)-th controller.

It will now be assumed that the central processing unit 11 is one that is manufactured and sold by Motorola under a trade name of MC 68010 and is put in operation with a machine clock frequency of 10 MHz. With a conventional interruption circuit of the type described with reference to FIGS. 1 and 2, it takes 2.0 microseconds to acknowledge receipt of the twice relayed interruption signal R(3) and additional 9.6 microseconds to receive the identification signal. In marked contrast, it takes only 2.0 microseconds with an interruption circuit illustrated with reference to FIGS. 3 through 7 to acknowledge receipt of the twice relayed interruption signal as the particular signal and to furthermore receive the m(n)-th interruption vector.

While this invention has thus far been described in specific conjunction with a sole preferred embodiment thereof, it will now be readily possible for one skilled in the art to put this invention into practice in various other manners. For example, it is possible to give each originating interruption signal S(1) the logic one level. When a computer system comprises a plurality of central processing units, such as 11, the interruption circuit should be used in connection with each of the central processing units. A memory for a plurality of bits can be substituted for the one-bit memory 52.

What is claimed is:

1. An interruption circuit for use in combination with a central processing unit and a multiplicity of interruption generating units, each of said interruption generating units being for generating an interruption signal upon occurrence of an interruption request, said interruption circuit comprising:

a scanning means between said central processing unit and said interruption generating units for scanning said interruption generating units, said scanning means operative to generating units as a particular unit generating said interruption signal and for supplying said central processing unit with the interruption signal generated by said particular unit, said central processing unit responsive to said interruption signal to produce a response signal;

a response supply means between said central processing unit and said interruption generating units for supplying said response signal to said particular unit; and a vector supply means for supplying from said particular unit, upon reception of said response signal and according to said count value, said central processing unit with an interruption vector which is unique to each of said interruption generating units, said central processing unit responsive to said interruption vector to perform interrupt operations related to said particular unit;

said interruption generating units being grouped into first through M-th groups including an m-th group, where M represents a first plurality, m representing a first selected number selected between 1 and M, both inclusive, said m-th group comprising m(1)-th through m(N)-th interruption generating units, where N represents a second plurality, and wherein said scanning means comprises, first through M-th polling circuits including an m-th polling circuit:

a connection arrangement between said first through said M-th polling circuits and said first through said M-th groups, respectively; and a scanning circuit between said central processing unit and said first through said M-th polling circuits for cyclically scanning said first through said M-th polling circuits, said scanning circuit operative to specify one of said first through said M-th polling circuits as a particular circuit during each cycle;

said m-th polling circuit being for cyclically scanning said m(1)-th through said m(N)-th interruption generating units to specify an m(n)-th interruption generating unit as an identified unit, where n represents a second selected number selected between 1 and N, both inclusive, said identified unit being said particular unit when said m-th polling unit said particular circuit, each of said multiplicity of interruption generating units producing the interruption signal when specified as said particular unit during presence of the interruption request therein;

said particular circuit and said scanning circuit supplying said central processing unit with the interruption signal generated by said particular unit and supplied to said particular circuit through said connection arrangement, and wherein said scanning circuit comprises, a scan counter for counting up a scan count repeatedly from 1 up to M to produce a scan count signal representative of said scan count; and a scan controlling arrangement connected to said first through M-th polling circuits and said scan counter for suspending count up of said scan count at m' when supplied with an m'-th interruption signal from an m'-th polling circuit, where m' represents selected count selected between 1 and M, both inclusive:

said scan controlling arrangement supplying said central processing unit with the interruption signal received from said m'-th polling circuit while said scan count signal represents said selected count;

said scan controlling arrangement supplying the scan count signal representative of said selected count to said first through said M-th polling circuits as an address for specifying said m'-th polling circuit as said particular circuit.

2. An interruption circuit as claimed in claim 1, wherein:

said response supply arrangement comprises first through M-th control circuits between said central processing unit and said first through said M-th groups, respectively, said first through said M-th control circuits including an m-th control circuit in correspondence to said m-th polling circuit:

said scanning circuit specifying one of said first through said M-th control circuits that corresponds to said particular circuit as a particular control circuit:

said m-th control circuit supplying said response signal to said m(1)-th through said m(N)-th interruption generating units when specified as said particular control circuit:

said m(n)-th interruption generating unit receiving the response signal when specified by said particular circuit as said particular unit.

3. An interruption circuit as claimed in claim 2, wherein said vector supply arrangement comprises a data bus between said central processing unit and said multiplicity of interruption generating unit for supplying said central processing unit with the interruption vector which is produced by said m(n)-th interruption generating unit as an m(n)-th interruption vector when said response signal is supplied to said m(1)-th through said m(N)-th interruption generating units and furthermore when said m(n)-th interruption generating unit is specified as said particular unit.

4. An interruption circuit as claimed in claim 3, wherein said m-th polling circuit comprises:

an m-th counter for counting up an m-th count repeatedly from 1 up to N to supply said m(1)-th through said m(N)-th interruption generating units with an m-th selection signal representative of said m-th count: and an m-th controlling arrangement connected to said scanning circuit, said connection arrangement, and said m-th counter and supplied through said connection arrangement with an m(n)-th interruption signal generated by said m(n)-th interruption generating unit for suspending count up of said m-th count at said second selected number to make said m-th selection signal indicate said m(n)-th interruption generating unit as said particular unit when said m-th polling circuit is specified as said particular unit:

said m-th controlling arrangement supplying said scanning circuit with said m(n)-th interruption signal while said m-th selection signal represents said second selected number.

5. An interruption circuit as claimed in claims 4, wherein:

said m-th polling circuit comprises an m-th clock generator for generating an m-th sequence of polling clock pulses:

said m-th controlling arrangement comprising:

an m-th delivery arrangement connected to said scanning circuit and said connection arrangement for supplying said scanning circuit with an m-th interruption signal generated by any one of said m(1)-th through said m(N)-th interruption generating units: and an m-th controller connected to said m-th counter, said m-th clock generator, and said m-th delivery arrangement for supplying said m-th counter with said clock pulses to make said m-th counter count said clock pulses as said m-th count while no interruption signal is generated by said m(1)-th through said m(N)-th interruption generating units, said m-th controller suspending supply of said clock pulses to said m-th counter when said m-th interruption signal is generated, said m-th controller making said m-th selection signal represent said second selected number when said m(n)-th interruption signal is generated.

6. An interruption circuit as claimed in claim 4, wherein said scan controlling arrangement comprises:

a scan clock generator for generating a sequence of scan clock pulses;

a scan delivery arrangement connected to said first through said M-th polling circuits and said scan clock generator for supplying said central processing unit with said m'-th interruption signal while said scan count signal represents said selected count; and a scan controller connected to said scan counter, said scan clock generator, and said scan delivery arrangement for supplying said scan counter with said scan clock pulses to make said scan counter count said scan clock pulses as said scan count while no interruption signal is received from said first through said M-th polling circuits, said scan controller suspending supply of said scan clock pulses to said scan counter when said m'-th interruption signal is received, said scan controller making said scan count signal represent said selected count when said m'-th interruption signal is received.

7. An interruption circuit as claimed in claim 4, wherein said m-th control circuit is assigned with an m-th interruption response number and comprises:

an m-th collating circuit connected to said scanning circuit for collating said m-th interruption response number with the selected count represented by said address signal to produce an m-th coincidence signal when said selected count is coincident with said m-th interruption response number: and an m-th supply arrangement connected to said m-th collating circuit between said central processing unit and said m(1)-th through said m(N)-th interruption generating units for supplying said response signal to said m(1)-th through said m(N)-th interruption generating units when said m-th coincidence signal is produced.

8. An interruption circuit as claimed in claim 7, wherein said m(n)-th interruption generating unit is assigned with an m(n)-th unit number and comprises:

an m(n)-th collating circuit connected to said m-th controlling arrangement for collating said m(n)-th unit number with the second selected number represented by said m-th selection signal to produce an m(n)-th coincidence signal when said second selected number is coincident with said m(n)-th unit number;

an m(n)-th one-bit memory for memorizing said m(n)-th interruption signal;

an m(n)-th controller connected to said m-th controlling arrangement, said m-th supply arrangement, said connection arrangement, said m(n)-th collating circuit, and said m(n)-th one-bit memory for making said m(n)-th one-bit memory supply said m(n)-th interruption signal to said connection arrangement when said m(n)-th coincidence signal is produced while said m(n)-th interruption signal is memorized in said m(n)-th one-bit memory, said m(n)-th controller resetting said m(n)-th one-bit memory when said central processing unit gives an end to said response signal; and an m(n)-th buffer connected to said data bus and said m(n)-th controller for buffering said m(n)-th interruption vector and for supplying said data bus with said m(n)-th interruption vector when said response signal is supplied to said m(1)-th through said m(N)-th interruption generating units while said m(n)-th interruption signal is delivered to said connection arrangement.

9. An m(n)-th interruption generating unit which is an m(n)-th one of a multiplicity of interruption generating units grouped into first through M-th groups including an m-th group comprising m(1)-th through m(N)-th interruption generating units, where M represents a first plurality, N representing a second plurality, m representing a first selected number selected between 1 and M, both inclusive, n representing a second selected number selected between 1 and N, both inclusive, said multiplicity of interruption generating units being for use in combination with an interruption circuit which is for supplying a central processing unit with an interruption signal generated by a particular unit of said multiplicity of interruption generating units to make said central processing unit produce a response signal, for supplying said central processing unit additionally with an identification signal indicative of said particular unit to make said central processing unit perform interrupt operations related to said particular unit, for producing an m-th selection signal representative of a count cyclically variable between 1 and N, both inclusive, and for supplying, when said interruption signal is generated by said m(n)-th interruption generating unit as an m(n)-th interruption signal, said response signal to said m(1)-th through said m(N)-th interruption generating units, wherein said m(n)-th interruption generating unit is assigned with an internally maintained n-th unit number and comprises:

an m(n)-th collating circuit supplied with said m-th selection signal for collating said n-th unit number with said count to produce a coincidence signal when said count is coincident with said n-th unit number;

an m(n)-th one-bit memory for memorizing said m(n)-th interruption signal at a first value;

an m(n)-th controller connected to said collating circuit and said one-bit memory and supplied with said response signal from said interruption circuit, said one-bit memory responsive to said m(n)-th controller to produce said m(n)-th interruption signal when said coincidence signal is produced while said m(n)-th interruption signal is memorized in said one-bit memory, said controller resetting said one-bit memory to a second value when said central processing unit gives an end to said response signal; and an m(n)-th buffer connected to said controller for buffering an m(n)-th interruption vector and for supplying said interruption vector to said interruption circuit as said identification signal when said controller makes said one-bit memory produce said m(n)-th interruption signal and receives the response signal from said interruption circuit.

* * * * *